US008051666B2

(12) United States Patent
Theriault (10) Patent No.: US 8,051,666 B2
(45) Date of Patent: Nov. 8, 2011

(54) MICROPOROUS GRAPHITE FOAM AND PROCESS FOR PRODUCING SAME

(75) Inventor: Philip Christopher Theriault, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/079,137

(22) Filed: Apr. 4, 2011

(65) Prior Publication Data

US 2011/0189077 A1    Aug. 4, 2011

Related U.S. Application Data

(62) Division of application No. 10/872,933, filed on Jun. 21, 2004, now Pat. No. 7,939,046.

(51) Int. Cl.
*F01C 13/08*     (2006.01)
*C01B 31/04*     (2006.01)
*B29C 44/12*     (2006.01)

(52) U.S. Cl. ........ 62/53.2; 423/448; 264/45.3; 264/29.7

(58) Field of Classification Search ............. 423/445 R, 423/448; 264/41–44, 45.1–45.9, 46.1–46.9, 264/48–55, 29.1–29.7; 62/53.2
See application file for complete search history.

(56) References Cited

U.S. PATENT DOCUMENTS

| 3,387,940 | A | 6/1968 | McHenry et al. | 423/448 |
|---|---|---|---|---|
| 3,943,213 | A | 3/1976 | Whittaker et al. | 423/448 |
| 4,067,956 | A | 1/1978 | Franklin et al. | 423/445 |
| 4,276,246 | A | 6/1981 | Bonzom et al. | 264/53 |
| 4,819,451 | A | 4/1989 | Hingst | 62/514 |
| 5,167,945 | A | 12/1992 | Ogawa et al. | 423/448 |
| 5,269,984 | A | 12/1993 | Ono et al. | 264/29.2 |
| 5,365,746 | A | 11/1994 | Warner et al. | 62/51.2 |
| 5,594,060 | A | 1/1997 | Alig et al. | 524/496 |
| 5,811,816 | A | 9/1998 | Gallagher et al. | 250/370.15 |

(Continued)

FOREIGN PATENT DOCUMENTS

EP            0 374 925 B1     6/1990
(Continued)

OTHER PUBLICATIONS

Seaman et al.; "Enhanced Thermal Conductance of ORU Radiant Fin Thermal Interface Using Carbon Brush Materials"; Proceedings of Space Technology & Applications Forum (STAIF-99); Jan. 31-Feb. 4, 1999.

(Continued)

*Primary Examiner* — Daniel C. McCracken
(74) *Attorney, Agent, or Firm* — Renner, Otto, Boisselle & Sklar, LLP (57) ABSTRACT

A microporous graphite foam, comprising a matrix of graphite fibers joined by a graphitized graphite-forming precursor, wherein the foam comprises irregular interstitial spaces having an average pore size in the range from about 0.1 to about 10 microns and a void fraction in the range from about 80% to about 95%. A process for producing a microporous graphite foam including a matrix of graphite fibers joined by a graphitized graphite-forming precursor. In its various embodiments, the graphite foam has one or more of pore sizes less than about ten microns, low bulk density, high physical strength and good machinability, while also having the desirable characteristics of graphite, including high thermal conductivity, electrical conductivity and solderability. A cryogenic cooling system including the graphite foam. In one embodiment, the graphite foam is a component of a cooling interface in the cryogenic cooling system.

12 Claims, 3 Drawing Sheets

U.S. PATENT DOCUMENTS

| | | | | |
|---|---|---|---|---|
| 5,846,509 | A | 12/1998 | Alig et al. | 423/447.3 |
| 5,868,974 | A | 2/1999 | Kearns | 264/29.6 |
| 5,945,084 | A | 8/1999 | Droege | 423/447.4 |
| 5,961,814 | A | 10/1999 | Kearns | 208/39 |
| 6,033,506 | A | 3/2000 | Klett | 156/78 |
| 6,037,032 | A | 3/2000 | Klett et al. | 428/71 |
| 6,103,149 | A | 8/2000 | Stankiewicz | 264/29.1 |
| 6,156,256 | A | 12/2000 | Kennel | 264/461 |
| 6,287,375 | B1 * | 9/2001 | Klett | 106/122 |
| 6,502,419 | B2 | 1/2003 | Pfister et al. | 62/497 |
| 6,506,355 | B1 | 1/2003 | Glasgow et al. | 423/447.3 |
| 6,576,168 | B2 | 6/2003 | Hardcastle et al. | 264/29.1 |
| 6,604,366 | B1 | 8/2003 | Pflibsen | 62/53.2 |
| 6,673,328 | B1 | 1/2004 | Klett et al. | 423/445 |
| 6,689,336 | B2 | 2/2004 | Kanno et al. | 423/445 |
| 6,733,737 | B1 | 5/2004 | Tan et al. | 423/447.5 |
| 7,229,944 | B2 | 6/2007 | Shao-Horn et al. | 502/182 |
| 7,252,884 | B2 | 8/2007 | Su et al. | 428/408 |
| 2003/0034575 | A1 | 2/2003 | Hardcastle et al. | 264/29.7 |
| 2003/0064216 | A1 | 4/2003 | Tobita et al. | 428/323 |
| 2003/0162007 | A1 | 8/2003 | Klett et al. | 428/304.4 |

FOREIGN PATENT DOCUMENTS

| | | |
|---|---|---|
| EP | 0 758 028 B1 | 9/2002 |
| WO | 00/43314 | 7/2000 |

OTHER PUBLICATIONS

Seaman et al.; "Carbon Velvet Thermal Interface Gaskets"; Paper for 39$^{th}$ AIAA Aerospace Sciences Meeting; Jan. 2001.

Hardy et al.; "High-Thermal-Conductivity, Mesophase-Pitch-Derived Carbon Foams: Effect of Precursor on Structure and Properties"; *Carbon*, 38(7), pp. 953-973 (2000).

International Search Report and Written Opinion, Application No. PCT/US2005/020617, mailed Apr. 3, 2006.

Fitzer, et al., Recommended Terminology for the Description of Carbon as a Solid, Pure & Appl. Chem. 1995; 67(3): 473-506.

Klett, et al., High-thermal-conductivity, mesophase-pitch-derived carbon foams: effect of precursor on structure and properties, Carbon 38 (2000) 953-973.

Definition of nascent, www.merriam-webster.com, accessed Oct. 12, 2009.

* cited by examiner

MICROPOROUS GRAPHITE FOAM AND PROCESS FOR PRODUCING SAME

CROSS-REFERENCE TO RELATED APPLICATION

The present application is a division of and claims priority under 35 U.S.C. §121 to U.S. application Ser. No. 10/872,933, filed 21 Jun. 2004, now U.S. Pat. No. 7,939,046, the entirety of which is hereby incorporated by reference herein.

TECHNICAL FIELD

The present invention relates generally to graphite foam materials, and more particularly to a microporous graphite foam, to processes for producing the same and to articles comprising the same.

BACKGROUND

Many uses are known for carbon and graphite foam materials, and a number of processes have been developed for making carbon and graphite foams. Known uses include uses such as a heat sink, a heating element, an electrical conductor, a lightweight form filling body for composite structures, cryostatic devices for cooling detectors such as infrared, electron, X-ray or other radiation detectors, a fuel cell element, a membrane for separation of conductive fluids, and combinations of these. Graphite has a very high conductivity, and foams made of graphite share this characteristic.

Most processes for making graphite foams include some combination of the application of heat and inert gases under high pressure to a material such as pitch which can be converted to graphite, followed by changes in pressure and/or temperature in which bubbles or voids are caused to form in the material, and subsequent carbonization and graphitization. Such processes generally produce foams having pore sizes substantially greater than ten microns and are not capable of producing microporous graphite foams having a pore size less than about ten microns, while still having features such as a low bulk density, low brittleness and acceptable physical strength. The low brittleness and physical or mechanical strength are needed for subsequent handling and machining into items having a shape other than a relatively simple molded shape. Low bulk density is needed for light weight. While prior art methods could attain some of these characteristics, it has not been possible to attain desired combinations of them together with a microporous structure.

Thus, a need remains for a microporous graphite foam having pore sizes less than ten microns, low bulk density and good physical strength for subsequent handling and machining into items having a shape other than a relatively simple molded shape, while also having the desirable characteristics of graphite, including light weight, high thermal conductivity, electrical conductivity and solderability.

SUMMARY

In accordance with one embodiment, the present invention relates to a process for producing a microporous graphite foam. In one embodiment, the process includes providing a plurality of graphite fibers; mixing the graphite fibers with a graphite-forming precursor; compressing the mixture; forming a precursor matrix comprising the graphite fiber and the graphite-forming precursor; first heating the matrix to a temperature at which the graphite-forming precursor is carbonized, forming a carbonized matrix; and second heating the carbonized matrix to a temperature at which the carbonized graphite-forming precursor is graphitized, forming the microporous graphite foam. As a product of this process, in various embodiments, the present invention provides a graphite foam having one or more of pore sizes less than about ten microns, low bulk density, high physical strength and good machinability, while also having the desirable characteristics of graphite, including high thermal conductivity, electrical conductivity and solderability.

In accordance with another embodiment, the present invention relates to a microporous graphite foam, comprising a matrix of graphite fibers joined by a graphitized graphite-forming precursor. In one embodiment, the graphite fibers have an initial diameter of about 0.1 micron, and are joined in the graphite foam product by the graphitized graphite-forming precursor to form an interconnected structure. In various embodiments, the graphite foam has one or more of pore sizes less than about ten microns, low bulk density, high physical strength and good machinability, while also having the desirable characteristics of graphite, including high thermal conductivity, electrical conductivity and solderability.

In one embodiment, the present invention relates to microporous graphite foam, comprising a matrix of graphite fibers joined by graphitized graphite-forming precursor made by a process which includes providing a plurality of graphite fibers; mixing the graphite fibers with a graphite-forming precursor; compressing the mixture; forming a precursor matrix comprising the graphite fiber and the graphite-forming precursor; first heating the matrix to a temperature at which the graphite-forming precursor is carbonized, forming a carbonized matrix; and second heating the carbonized matrix to a temperature at which the carbonized graphite-forming precursor is graphitized, forming the microporous graphite foam. In various embodiments, the product of this process is a graphite foam having one or more of pore sizes less than about ten microns, low bulk density, high physical strength and good machinability, while also having the desirable characteristics of graphite, including high thermal conductivity, electrical conductivity and solderability.

In one embodiment, the graphite fibers comprise vapor grown carbon fibers.

Thus, in its various embodiments, the present invention responds to the continuing needs for graphite foams having desirable characteristics, such as those described above.

It should be appreciated that for simplicity and clarity of illustration, elements shown in the Figures have not necessarily been drawn to scale. For example, the dimensions of some of the elements may be exaggerated relative to each other for clarity. Further, where considered appropriate, reference numerals have been repeated among the Figures to indicate corresponding elements.

DETAILED DESCRIPTION

It should be appreciated that the process steps and structures described below may not form a complete process flow for manufacturing a graphite foam product. The present invention can be practiced in conjunction with graphite foam and/or carbon foam fabrication techniques currently used in the art, and only so much of the commonly practiced process steps are included as are necessary for an understanding of the present invention.

In accordance with one embodiment, the process for producing a microporous graphite foam includes:

providing a plurality of graphite fibers;

mixing the graphite fibers with a graphite-forming precursor;

compressing the mixture;

forming a precursor matrix comprising the graphite fiber and the graphite-forming precursor;

first heating the matrix to a temperature at which the graphite-forming precursor is carbonized, forming a carbonized matrix; and second heating the carbonized matrix to a temperature at which the carbonized graphite-forming precursor is graphitized, forming the microporous graphite foam. Each of these and additional steps are described in detail in the following disclosure.

Graphite Fibers

In one embodiment, the graphite fibers have an average diameter in the range from about 50 to about 250 nanometers. In another embodiment, the graphite fibers have an average diameter in the range from about 75 to about 150 nanometers, and in yet another embodiment, the graphite fibers have an average diameter of about 100 nanometers (about 0.1 micron).

Here, as elsewhere in the specification and claims, the range and ratio limits may be combined. Thus, for example, the foregoing disclosed ranges are deemed to include a range from about 50 to about 150 nanometers and to include a range from about 75 to about 250 nanometers, although such were not explicitly recited.

In one embodiment, the graphite fibers have an average length in the range from about 20 microns to about 200 microns, and in another embodiment, the graphite fibers have an average length in the range from about 30 to about 100 microns. This disclosed average length of the fibers is the length of the fibers provided for use in the process, and is measured by estimating the end-to-end length along the fibers, including (i.e., following along the path of) any curling or bending. As will be understood, the length of the fibers may be reduced during the processing described below.

In one embodiment, the graphite fibers have an ordered molecular structure. The ordered molecular structure imparts greater mechanical or structural strength and greater both electrical and thermal conductivity to the fibers. In one embodiment, the graphite fibers are randomly curled. The term randomly curled means that the fibers are not straight, and may range from slightly curved to curled to tightly curled. Although not to be bound by theory, it is believed that the random curling contributes to the regular structure of the graphite foam product by preventing bunching of the fibers. Straight fibers tend to bunch together if used exclusively, which reduces space to hold the graphite-forming precursor and solvent and may reduce pore size in the graphite foam product. The random curling may also provide mechanical or structural strength, for example, by providing many locations for attachment to neighboring graphite fibers, which attachment is obtained via the graphitized graphite-forming precursor described below. In addition, the randomly curled structure may also provide mechanical or structural strength by virtue of the 3-dimensional shape of the curled fibers.

In one embodiment, the graphite fibers used in the present invention are PYROGRAF®-III graphite fibers from Pyrograf Products, Inc., dba Applied Sciences, Inc., Cedarville, Ohio. PYROGRAF®-III graphite fibers are described as very fine, highly graphitic carbon nanofibers having lengths estimated to be 50 to 100 microns and diameters ranging from 70 to 200 nanometers. As noted on Pyrograf's web site, the PYROGRAF®-III graphite fibers are much smaller in diameter than conventional continuous or milled carbon fibers (5 to 10 microns diameter), but much larger than carbon nanotubes (about 1 nanometer diameter). In one embodiment, the graphite fibers used in the present invention are grade LHT or grade HHT, and may be of type PR-19 or PR-24, PYROGRAF®-III graphite fibers.

In one embodiment, in addition to the graphite fibers, carbon nanotubes may be included together with the graphite fibers. As is known in the art, carbon nanotubes have an average diameter of about 1 to about 1.4 nanometers, and in one embodiment, an average of about 1.2 nanometers, and a length ranging from a small multiple of the diameter to millions of the diameter. In one embodiment, the nanotube may range from about 1 to about 100 microns in length. Carbon nanotubes are fullerene-related structures which consist of graphene cylinders that may be closed at either end with a cap containing pentagonal rings. In one embodiment, the nanotube is a single-walled carbon nanotube (SWNT), and in another embodiment, the nanotube is a multi-walled nanotube (MWNT). Carbon nanotubes are extremely strong and, depending on the exact structure, may be highly conductive of both electrical current and heat. Carbon nanotubes can be made by a number of methods known in the art, and are available from a number of commercial sources.

In an embodiment in which carbon nanotubes are included, the carbon nanotubes may comprise from about 10% to about 90% by weight of the total fiber content, i.e., the total of carbon nanotube "fibers" and graphite fibers. In one embodiment, the carbon nanotubes may comprise from about 20% to about 80% by weight of the total fiber content.

Graphite-forming Precursors

In the process of the present invention, the graphite fibers are mixed with a graphite-forming precursor. Any suitable, known graphite-forming precursor may be used. In one embodiment, the graphite-forming precursor comprises one or more of a phenolic resin, a urethane resin, furfuryl alcohol and mesophase pitch. In one embodiment, the graphite-forming precursor is mesophase pitch.

Mesophase pitch is also known as anisotropic pitch, and comprises molecules having aromatic structures which through interaction are associated together to form ordered liquid crystals. Mesophase pitch has a complex mixture of numerous polynuclear aromatic compounds containing anisotropic liquid-crystalline particles detectable by optical microscopy. It is thought that mesophase pitch particles are formed by aggregation of polynuclear aromatic compounds in mesogenic pitch into the particles of which the mesophase is characterized. Mesophase pitch is generally not oriented. However, when processed with graphite fibers in the present invention, the graphite fibers act as a crystal seed and the pitch orients itself around the graphite fibers. Thus, in one embodiment, the graphite fibers have an ordered molecular structure, and the graphitized graphite-forming precursor forms an ordered molecular structure in conjunction with the graphite fibers. Thus, the structure may be crystalline on a small scale, i.e., microcrystalline, and in some embodiments it may have a highly ordered molecular structure, which thermally connects to the graphite fibers.

Mesophase pitch usually has a softening point ranging from about 230° C. to over 300° C.

Among the mesophase pitches useful as the graphite-forming precursor are high purity mesophase pitches obtained from petroleum hydrocarbon or coal tar sources. Methods for preparing a suitable pitch include those disclosed in U.S. Pat. Nos. 3,974,264, 4,026,788, 4,209,500 and 5,538,621, and any of these methods as well as the variety of solvent-based and pitch fractionation processes known in the art may be employed for producing mesophase pitch useful in the present invention. The mesophase pitch useful in the practice of this invention in one embodiment comprises greater than 90 wt % mesophase, and in another embodiment is a substantially 100 wt % mesophase pitch, as known in the art. Suitable pitches also include pitches synthesized from other chemical substrates by a variety of well-known processes.

In one embodiment, the mesophase pitch is a synthetic mesophase pitch, such as one prepared by the process described in Mochida et al, U.S. Pat. No. 4,891,126, issued Jan. 2, 1990. This patent discloses a mesophase pitch obtained from polymerizing a condensed polycyclic aromatic hydrocarbon, such as naphthalene, in the presence of a hydrogen fluoride/boron trifluoride catalyst, which pitch contains at least about 90% of an optically anisotropic phase. An exemplary pitch is AR Resin® manufactured by Mitsubishi Gas Chemical Co., Tokyo, Japan. This pitch is believed to be produced by the catalytic polymerization of naphthalene and is supplied in pellet form. The pitch has a softening temperature of 239° C., is 100% anisotropic, and has a glass transition temperature range of 230° to 260° C. Suitable mesophase pitches are available from Mitsubishi Gas Chemical Co., Inc., Tokyo, Japan (e.g., the AR Resin®), and from ConocoPhillips, Houston, Tex.

In one embodiment, the graphite-forming precursor is a pitch such as an isophase pitch or a mixture of isophase and mesophase pitches. Isophase pitch has a less ordered structure and therefore yields a graphite having a less ordered structure. In one embodiment, having less order, the structure is generally considered to have a lower thermal conductivity. In one embodiment, a graphite obtained from isophase pitch has one or more of less order, less crystal structure and may have a higher bonding or mechanical strength as compared to a graphite obtained from mesophase pitch.

In contrast to the mesophase pitch, when used as the graphite forming precursor, urethane resin tends to form less ordered structures with the graphite fibers than does the mesophase pitch. In some embodiments, when urethane resin or phenol is used instead of the graphite-forming precursor, the resulting carbon is not thermally connected to the graphite fibers as well as graphite formed from mesophase pitch.

Solvents

The choice of suitable solvents depends on the graphite-forming precursor selected for use. In an embodiment in which the precursor is furfuryl alcohol, no solvent may be necessary. In an embodiment in which the precursor is a phenolic resin or a urethane resin, suitable solvents include, for example, organic solvents such as those mentioned below, alcohols, and combinations of any of these.

In an embodiment in which the precursor is mesophase pitch, suitable solvents include paraffin hydrocarbon solvents such as hexane and higher branched and unbranched hydrocarbons, aromatic hydrocarbon solvents such as benzene, toluene and xylene, organic solvents such as acetone and methyl-ethyl ketone. In one embodiment, suitable solvents include one or more highly aromatic hydrocarbons including hydrocarbons in which, for example, 40% or more (40-100%) of the carbons in the solvent are aromatic carbons. Such solvents may include one, two, and three ring aromatic solvents which may optionally have short alkyl side chains of from $C_1$-$C_6$ and hydroaromatic solvents which may optionally have short alkyl side chains of from $C_1$-$C_6$. In one embodiment, solvent mixtures may contain both aromatic and paraffinic components, such as heptane, to adjust solubility. Exemplary solvents include one or more of tetralin, xylene, toluene, naphthalene, anthracene, and 9,10-dihydrophenanthrene. In other embodiments, suitable solvents may include pyridine, quinoline and chloroform.

Processes for Forming Microporous Graphite Foams

Figure 1:
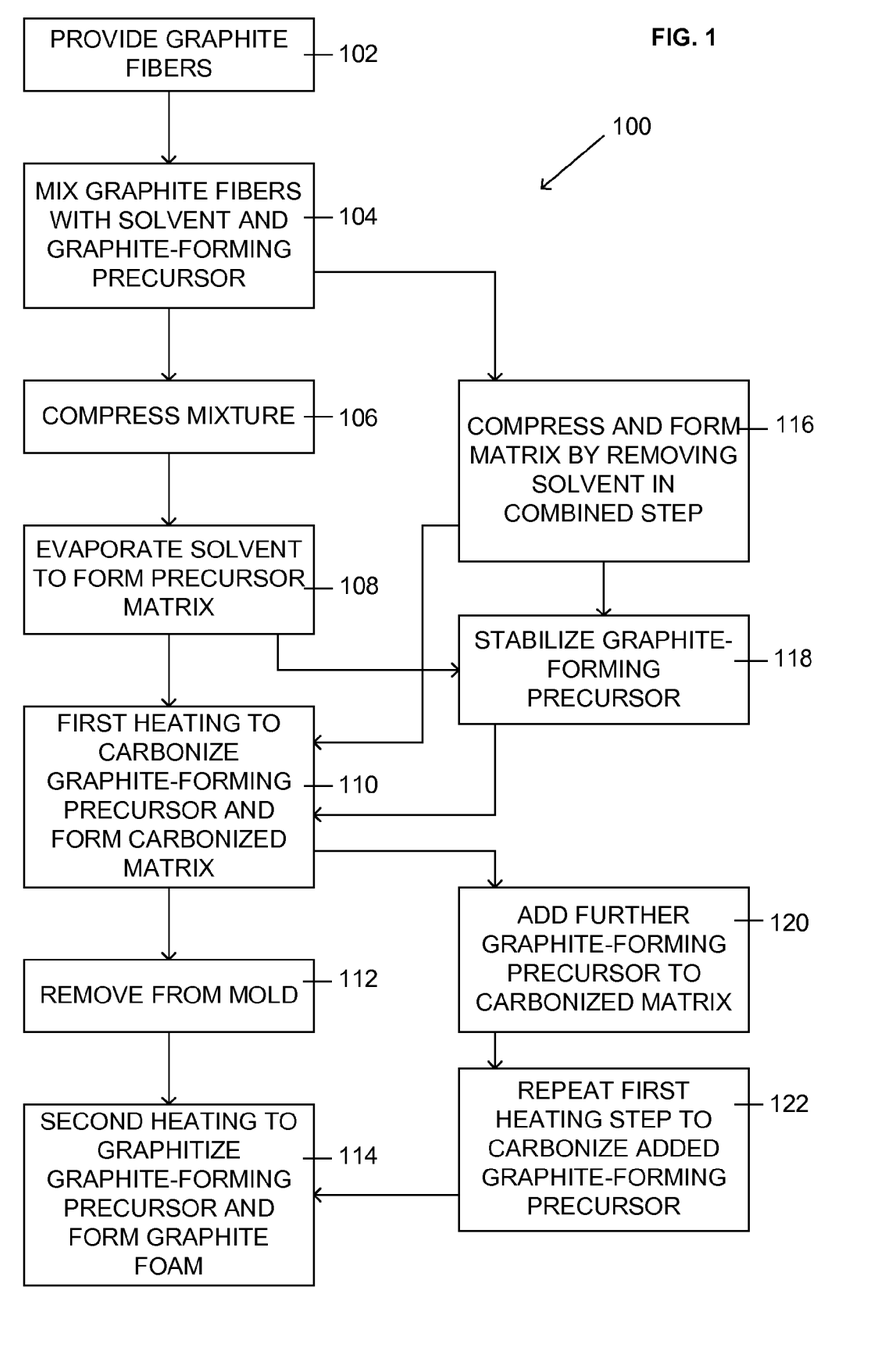
FIG. 1 is a schematic process flow diagram, illustrating several illustrative embodiments of processes in accordance with the present invention.

FIG. 1 is a schematic process flow diagram illustrating various embodiments of processes in accordance with the present invention. The steps schematically illustrated in FIG. 1 are described in detail in the following.

In carrying out the process of producing the microporous graphite foam, when the plurality of graphite fibers have been provided, the graphite-forming precursor is dissolved in a suitable solvent. The ratio of precursor to solvent in the solution may be suitably selected to obtain a desired rheology and viscosity of the precursor/solvent solution. It is noted that, although the term "solution" is used, as will be understood, the "solution" includes such other mixtures as dispersions, suspensions, colloids and other forms as may be present in any given mixture.

Next, in one embodiment, a small amount of the solution of graphite-forming precursor is added to and mixed with the graphite fibers. In one embodiment, the solvent and graphite-forming precursor are added to the fibers. In one embodiment, the mixing may be accomplished or continued by adding the graphite fibers, which may be in the form of a dry, pourable powder, to the solution of graphite-forming precursor and mixing suitably, or by adding more graphite fibers to an initially formed mixture of graphite fibers and graphite-forming precursor solution. The mixing should not be a high shear mixing, in order to avoid breaking the graphite fibers into smaller pieces. If other additives, such as carbon nanotubes, are to be included, these can be added at any appropriate point.

As a separate step or as a further part of the mixing, the mixture of solvent, graphite-forming precursor and graphite fibers is compressed, thus reducing the size of the interstitial spaces in the mixture. In one embodiment, the compressing also serves to define a shape of the initial matrix and, in some embodiments, the final graphite foam which will be formed by the process. The compressing may be suitably carried out by techniques known in the art for forming carbon fiber matrices. As the mixture is compressed, the graphite fibers, which in one embodiment are randomly curled, are brought into more intimate contact with each other and with the graphite-forming precursor. The compression provides strength to the graphite foam, and reduces the volume of the mixture.

As a separate step, or as a continuation of the mixing and compressing, a precursor matrix including the graphite fibers and the graphite-forming precursor is formed by removing the solvent. As the solvent is further removed, a relatively stable precursor matrix is formed in which the graphite-forming precursor acts to assist in holding together the graphite fibers at their contact points, somewhat like an adhesive or glue. The connections between graphite fibers formed by the graphite-forming precursor may be considered as nascent bonding elements of the precursor matrix and of the eventual graphite foam. The precursor matrix includes a large number of relatively large interstitial spaces formed by the graphite fibers and the graphite-forming precursor. Thus, the graphite-forming precursor forms an integral part of the precursor matrix and of the nascent foam. The interstitial spaces eventually will become the pores of the foam.

In one embodiment, following the compressing and forming of the precursor matrix, including removing the solvent, the precursor matrix, and the graphite-forming precursor in particular, is stabilized by heating in an atmosphere comprising oxygen. Such stabilizing is conventionally known and used in carbonizing and graphitizing processes. Such stabilization is considered to cross-link the graphite-forming precursor, and to "set" the graphite-forming precursor so that it does not melt during subsequent heating steps. This embodiment is an optional step in this process, and may not be necessary to the process of the invention. In an embodiment including a material such as furfuryl alcohol as the graphite-forming precursor, the stabilizing step may cause the furfuryl alcohol to partially polymerize, forming a resin. In one embodiment, because the intended product is a foam, loss of some of the graphite-forming precursor in the form of methane or carbon dioxide or other thermal breakdown products resulting from the stabilizing is not deleterious to the graphite foam product.

The compressed, at least substantially solvent-free, matrix is next heated in a first heating step to a temperature at which the graphite-forming precursor is carbonized, thus forming a carbonized matrix. The final temperature of this step is in the range from about 900° C. to about 1100° C., and in one embodiment, the final temperature of this step is about 1000° C. The heating may be carried out at a suitable rate such as, in one embodiment, from about 1° C./minute to about 10° C./minute. Suitable heating rates, within or outside this exemplary range, may be selected by those of ordinary skill in the art. The heating rate may be adjusted as required to avoid problems, e.g., from uneven heat distribution in the nascent carbonized matrix or foam. This step is carried out in an inert atmosphere, and may be at a pressure above or below atmospheric pressure. The inert atmosphere may be any inert atmosphere known for such processes, including one or more of nitrogen, argon, helium, and other known inert gases. As will be understood, reactive gases such as oxygen should be excluded. In one embodiment, the final temperature is held for about one hour, but other suitable times may be determined by those of ordinary skill in the art. In one embodiment, the time at which the final temperature is held is sufficient to fully carbonize the graphite-forming precursor. The first heating step, in one embodiment, forms a carbonized matrix, in which the graphite-forming precursor has been carbonized. In this carbonized matrix, the carbonized graphite-forming precursor continues to function as an integral part of the structure of the nascent foam. The carbonized graphite-forming precursor may function, for example, to help maintain the structure of the nascent foam.

As will be recognized, unlike other graphite foam forming processes, the process of the present invention does not use pressure and/or temperature changes to actually form the foam structure. In the present invention, the foam structure is formed in the steps of mixing the graphite fibers with the solution of the graphite-forming precursor, compressing and forming the precursor matrix.

In one embodiment, following the first heating, the carbonized matrix is removed from the mold. At this point in the process, and in one embodiment, the "green mold" or carbonized matrix has sufficient strength and cohesion to be handled. Thus, subsequent steps may be carried out without use of a mold.

In one embodiment, following an initial carbonization step, the carbon foam matrix produced at this point is again infiltrated with additional solution of the graphite-forming precursor, which in one embodiment may also include additional graphite fibers or carbon nanotubes. In one embodiment, the addition of more graphite-forming precursor provides added strength and/or smaller pore size to the graphite foam product. As will be recognized, if additional graphite-forming precursor is added, the void volume of the graphite foam can be reduced. In this alternate embodiment, following the addition to the carbonized matrix of additional graphite-forming precursor, the carbonizing step is repeated.

Following the first heating, in one embodiment the carbonized matrix is subject to a second heating. In the second heating, the carbonized matrix is heated to a temperature at which the carbonized graphite-forming precursor is graphitized, thus forming the microporous graphite foam. The final temperature of this step is in the range from about 2800° C. to about 3200° C., in one embodiment, the final temperature of this step is in the range from about 2900° C. to about 3100° C., and in one embodiment, the final temperature of this step is about 3000° C. In one embodiment, the second heating step is similar to known graphitizing heating, in which temperatures in excess of about 2500° C., to about 3000° C. and higher may be reached. As is known, if the temperature is not sufficiently high, not all of the carbon will be graphitized, while the higher the temperature, the stronger the graphite, up to temperatures at which graphite may be lost to sublimation, e.g., about 3500° C. The heating may be carried out at a suitable rate, such as, in one embodiment, from about 1° C./minute to about 10° C./minute. Suitable heating rates, within or outside this exemplary range, may be selected by those of ordinary skill in the art. The heating rate can be adjusted as required to avoid problems from uneven heat distribution in the nascent graphite foam.

In one embodiment, the final temperature is held for a time ranging from about 1 minute to about 60 minutes, and in another embodiment, the final temperature is held for a time ranging from about 5 minutes to about 20 minutes, but other suitable times may be determined by those of ordinary skill in the art. In one embodiment, the time at which the final temperature is held is sufficient to fully graphitize the carbonized graphite-forming precursor and the carbonized matrix. This step is carried out in an inert atmosphere, and may be at a pressure above or below atmospheric pressure. The inert atmosphere may be any inert atmosphere known for such processes, including one or more of nitrogen, argon, helium, and other known inert gases.

Exemplary embodiments of processes for forming microporous graphite foams in accordance with the present invention are discussed with reference to FIG. 1, which is a process flow diagram in accordance with several exemplary embodiments of the inventive process. As shown in FIG. 1, the process 100, in accordance with an embodiment of the present invention, may be carried out in various embodiments, as shown by the steps 102-122. In one embodiment, the process includes the steps of providing a plurality of graphite fibers (step 102); mixing the graphite fibers with solvent and a graphite-forming precursor (step 104); compressing the mixture (step 106); forming a precursor matrix comprising the graphite fiber and the graphite-forming precursor including evaporating the solvent (step 108); first heating the matrix to a temperature at which the graphite-forming precursor is carbonized, forming a carbonized matrix (step 110); and second heating the carbonized matrix to a temperature at which the carbonized graphite-forming precursor is graphitized, forming the microporous graphite foam (step 114), taking the steps in the order shown vertically down the left side of the schematic flow chart. If a mold is used, the carbonized matrix may be removed from the mold prior to the second heating step (step 112).

As shown in the step 108, in an embodiment in which a solvent is used with the graphite-forming precursor, it can be removed in this step.

In one embodiment, following the step 104, mixing the graphite fibers with the graphite-forming precursor, the step 106, compressing the matrix, and the step 108, forming the matrix, may be combined into a single step 116, as shown in FIG. 1. In this embodiment, in the step 116 forming and compressing may be carried out concurrently or substantially simultaneously. As shown in the step 116, if a solvent is used with the graphite-forming precursor, it can be removed in this step. As shown in FIG. 1, in one embodiment, following the step 116, the process proceeds to the step 110.

In one embodiment, as shown in FIG. 1, following the step 108, a step of stabilizing the graphite-forming precursor in the matrix is carried out, as shown in step 118. As shown in FIG. 1, in this embodiment, following the stabilizing 118, the process proceeds to the step 110.

In another embodiment, as shown in FIG. 1, following the step 116, in which both forming the matrix and compressing the matrix are carried out, a step 118 of stabilizing the graphite-forming precursor in the matrix is carried out. As shown in FIG. 1, in this embodiment, following the stabilizing step 118, the process proceeds to the step 110.

In one embodiment, as shown in FIG. 1, following the first heating step 110, the nascent foam, in the form of the carbonized matrix, may be removed from the mold, as shown in step 112. Following the step 112, in this embodiment, the process proceeds to the step 114.

In one embodiment, as shown in FIG. 1, following the first heating step 110, additional graphite-forming precursor may be added to the carbonized matrix, as shown in step 120. Following this addition, the first heating step is repeated, as shown in step 122. Following the heating step 122, in this embodiment, the process proceeds to the graphitizing step 114.

Other embodiments of the process may be suitably carried out in accordance with the knowledge of those of ordinary skill in the art.

Microporous Graphite Foams

In one embodiment, the present invention relates to a microporous graphite foam, comprising a matrix of graphite fibers joined by a graphitized graphite-forming precursor. In one embodiment, the microporous graphite foam is the foam made by an embodiment of the processes described above.

In one embodiment, the graphite fibers in the graphite foam have a diameter in the range from about 50 to about 250 nanometers.

In one embodiment, the graphite fibers in the graphite foam have a length in the range from about 25 microns to about 250 microns.

In one embodiment, the graphite fibers have an ordered molecular structure.

In one embodiment, the graphitized graphite-forming precursor has a disordered molecular structure.

In one embodiment, the microporous graphitized foam has a void fraction in the range from about 10% to about 98%, and in one embodiment a void fraction up to about 95% and in another embodiment, a void fraction up to about 90%. In one embodiment, the void fraction is in the range from about 80% to about 95%, and in another from about 85% to about 90%.

The void fraction may be estimated or measured by any method known in the art. In one embodiment, the void fraction may be estimated simply by the following process. First the bulk density of the graphite foam is determined. The theoretical density of graphite is known. Taking the difference between the density of graphite and the measured bulk density of the graphite foam and dividing the dividend by the density of graphite yields the fraction of the foam that is void. Multiplying the resultant fraction by 100 yields an estimate of percent void fraction. In another embodiment, the void fraction may be estimated by taking a known volume of the graphite foam, immersing it in a liquid and determining the displacement volume of the graphite foam, subtracting this from the known volume and dividing by the known volume. This gives the void fraction as a fractional value, multiplying by 100 gives the void fraction as a percentage value.

In one embodiment, the microporous graphitized foam has an average pore size less than 10 microns, or less than about 10 microns, or in the range from about 0.1 to about 10 microns, and in another embodiment, in the range from about 1 to about 5 microns. In one embodiment, the microporous graphitized foam has an average pore size less than about 5 micron, and in one embodiment, the average pore size is in the range from about 0.1 micron to about 5 microns. The pore size of the graphite foam may be estimated or measured by any known method. In one embodiment, pore size can be estimated from a scanning electron micrograph.

In one embodiment, the pore size of the graphite foam of the present invention is at least partially a function of the curling of the randomly curled graphite fibers. The tighter the curling, the smaller the pore size. In one embodiment, the smaller the pore size, the physically stronger the foam.

In one embodiment, the graphite foam is brazeable. In one embodiment, the graphite foam is brazeable to a metal by methods known in the art, and in one embodiment by vaporizing a metal such as titanium or gold to form a brazeable connection between the graphite foam and a metal substrate to which it is desired to be attached. In one embodiment, titanium is first vaporized onto the graphite foam, followed by platinum, and in another embodiment, titanium is first vaporized onto the graphite foam, followed by gold, and in yet another embodiment, titanium is first vaporized onto the graphite foam, followed by gold and platinum in either order (gold/platinum or platinum/gold). Application of the metal to the graphite foam renders the foam brazeable to other metal structures with which it may be used.

In one embodiment, the brazing is carried out by brazing with an alloy of silver, copper and lithium. In one embodiment, the silver, copper and lithium alloy is commercially available as LITHOBRAZE™, from Lucas-Milhaupt, Inc., Cudahy, Wis. In one embodiment, an un-modified graphite foam of the present invention can be brazed by an alloy of silver, copper and lithium, such as LITHOBRAZE™. In one embodiment, an un-metallized graphite foam can be brazed by an alloy of silver, copper and lithium, such as LITHOBRAZE™. Additional brazing materials are known in the art for use with metallized graphite foam.

Exemplary Applications

Figure 2:
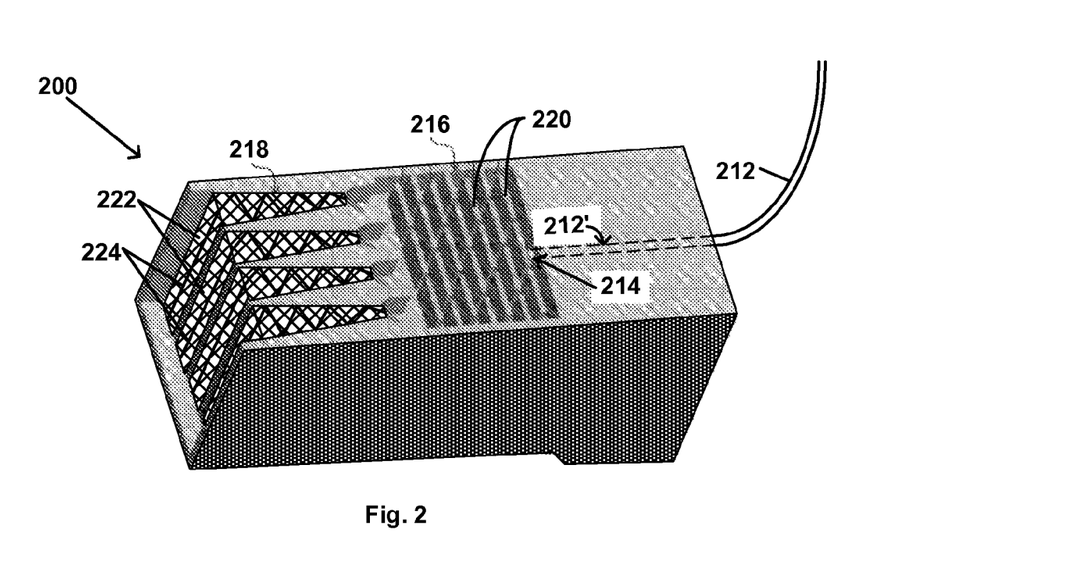
FIG. 2 is a schematic partially cut-away perspective view of an exemplary application of an embodiment of a graphite foam in accordance with the invention.

As noted previously, there are many uses for graphite foams. FIG. 2 is a schematic partially cut-away perspective view of an exemplary use of an embodiment of a graphite foam in accordance with the invention. In FIG. 2, the graphite foam of the present invention is depicted in use with a cooling interface of a cryogenic cooling system used, for example, in cooling electromagnetic energy detectors. Such cryogenic cooling systems are described in detail in U.S. Pat. No. 6,604,366 B1, the disclosure of which is hereby incorporated by reference in its entirety. The following brief description of the cryogenic cooling interface is set forth below, but only in sufficient detail to demonstrate this use of the graphite foam of the present invention. For details of the operation of such cryogenic cooling systems, reference should be had to U.S. Pat. No. 6,604,366 B1.

FIG. 2 shows a cryogenic cooling interface 200. The cryogenic cooling interface 200 is fed with input gas which can act as a cryogenic gas, such as nitrogen, helium or argon (from a source not shown here—see U.S. Pat. No. 6,604,366 B1) through the tube 212, which passes through a portion of the body of the interface 200 and is shown in phantom as the tube 212'. The tube 212' ends in a Joule-Thomson orifice 214, through which the input gas passes into a first cooling section 216. The input gas passes through the first cooling section 216 into a second cooling section 218. For illustrative purposes, top surfaces of the cooling interface 200 shown in FIG. 2 are removed. In an actual implementation of the cooling interface 200, the first cooling section 216 and the second cooling section 218 are enclosed. As described in detail in U.S. Pat. No. 6,604,366 B1, as the input gas is cycled repeatedly through a heat-exchange system, the gas eventually is cooled to cryogenic temperature. The cryogenic gas is used to maintain the temperature of the radiation detection device at low temperature to enhance its sensitivity. As described in U.S. Pat. No. 6,604,366 B1, the input gas initially enters the system at ambient temperature and by repeated passes through the device, is cooled to cryogenic temperature, e.g., for nitrogen, a temperature of 77° K. Initially, the output of the orifice 214 is gas only, but as the temperature is reduced, the liquid cryogen eventually emerges from the orifice 214.

The cooling interface 200 shown in the embodiment shown in FIG. 2 includes, for example, a focal plane array (FPA) assembly (not shown), which is part of an electromagnetic radiation detection system with which the cooling interface 200 is to be used. In the embodiment shown in FIG. 2, the graphite foam is used in the second cooling section 218. The first cooling section 216 is formed in the cooling interface 200 opposite the FPA assembly (not shown), which is mounted on a reverse side of the cooling interface 200. Although described here as a FPA, the system of U.S. Pat. No. 6,604,366 B1, including the graphite foam of the present invention, may be used with any type of equipment in need of cooling, especially cooling to cryogenic temperatures.

As shown in FIG. 2, the first cooling section 216 includes a plurality of three dimensional surfaces formed, in this embodiment, by a plurality of plates 220. For the purposes of the present disclosure, a three dimensional surface is a surface that includes a plurality of surface dips, grooves, contours, or compartments for increasing the surface area over that of a substantially flat surface. Such details are omitted from the plates 220 shown in FIG. 2, but should be understood to be present. As disclosed in the above-reference '366 patent, the three dimensional surfaces 220 depicted in FIG. 2 may be replaced by other three dimensional structures, such as pins or other structures or materials such as metal foams.

As shown in FIG. 2, the second cooling section 218 includes four flanges 222. While four flanges 222 are shown, any appropriate number may be used, as will be understood by those skilled in the art. In this embodiment, the flanges 222 are formed of the graphite foam of the present invention, illustrated by cross-hatched fill. The flanges 222 in this embodiment are foam wedges inserted into the metal framework and may be brazed thereto. The flanges 222 may be brazed to the body of the second cooling section 218. As noted above, in one embodiment, the graphite foam of the present invention can be brazed, thus allowing the foam to be used in the cooling interface 200 to replace heavier, larger pore-size materials such as copper mesh. Gas and eventually cryogenic gas flows from the first cooling section 216 into the second cooling section 218. The second cooling section 218 includes the plural flanges 222 designed to optimize thermal transfer between liquid and solid cryogen freezing in the second cooling section 218 and the FPA (or other device in need of cooling). The plural compartments formed by the foam in the flanges 222 ensure that sufficient surface area of the cooling interface 200 contacts the liquid cryogen to achieve optimum FPA temperature stability. The relatively large volume of the second cooling section 218 promotes long hold time and temperature stability of the interface 200. As illustrated in FIG. 2, the flanges 222 are divided by a slit 224, which forms a passageway through which the gas can pass while allowing liquid cryogen to be trapped in the graphite foam. The graphite foam of which the flanges 222 are formed is intended to and does trap liquid cryogen, thus prolonging the cooling effect thereof.

Thus, as illustrated in FIG. 2, the material previously used for the flanges 222, e.g., metal foam, may be replaced by the graphite foam of the present invention. The benefits of using the graphite foam for the flanges 222 includes large capacity for liquid and/or solid cryogen due to the very small pore sizes, light weight due to the high number of pores and low bulk density, solderability of the graphite foam, and high thermal conductivity.

The graphite foam of the present invention may replace the metal foam in other cryogenic cooling systems, such as that disclosed in U.S. Pat. No. 5,365,746, which discloses a Joule-Thomson cryostat having a dual cryogen system and employing a metal foam, such as aluminum or copper foam, "to enhance thermal equilibrium" in the disclosed cryocell. Metal foams such as that of U.S. Pat. No. 5,365,746 do not wick liquid cryogen well and do not form an efficient "sponge" to hold liquid cryogen. In contrast, the graphite foam of the present invention efficiently holds and absorbs liquid cryogen, thus greatly increasing the efficiency of heat transfer in devices such as those described in both U.S. Pat. Nos. 6,604,366 B1 and 5,365,746, and thus greatly increasing sensitivity of heat-sensitive devices such as the FPA detectors described with respect to FIG. 2.

Figure 3:
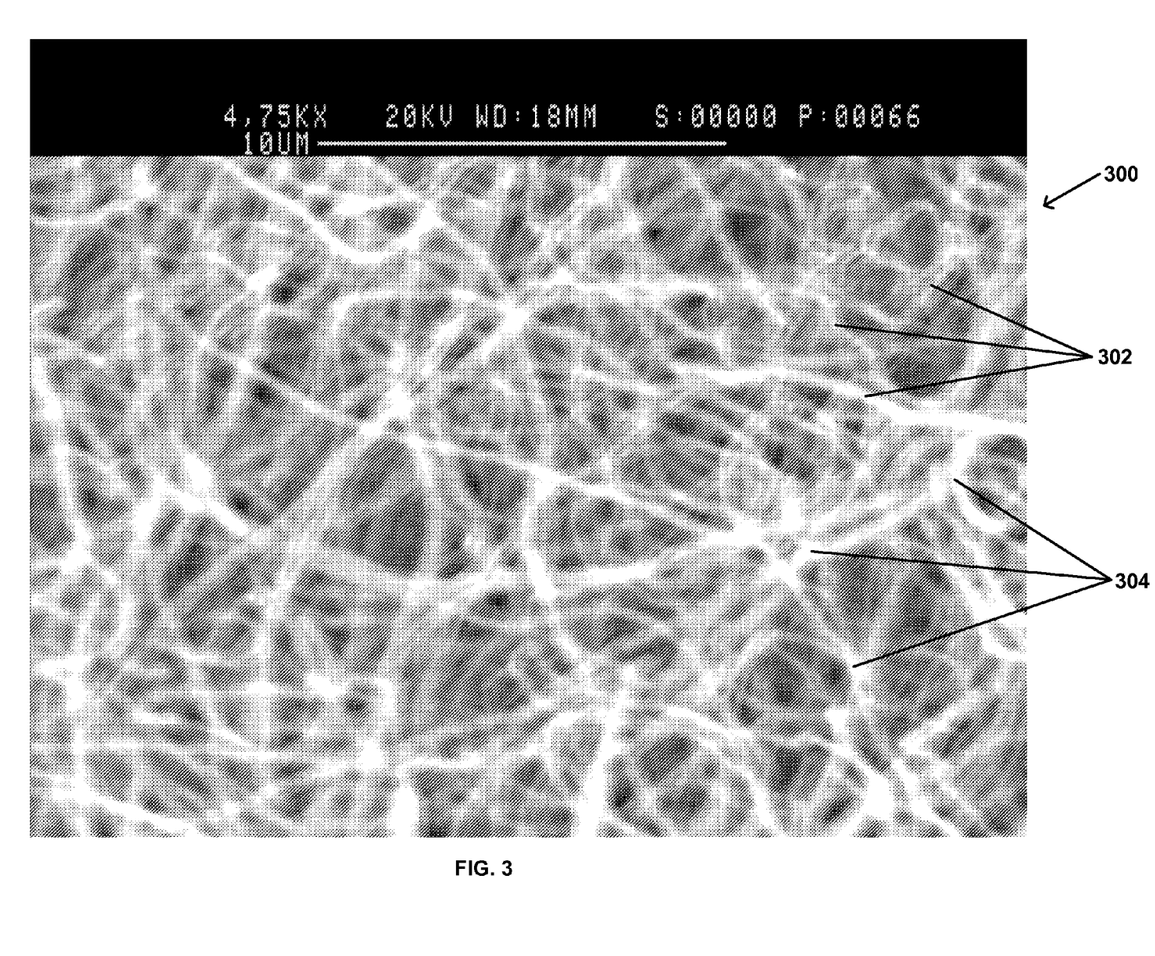
FIG. 3 is a photomicrograph of a graphite foam made in accordance with the present invention.

FIG. 3 is a photomicrograph of a microporous graphite foam 300 made in accordance with the present invention. As shown in FIG. 3, the microporous graphite foam 300 includes a matrix of graphite fibers 302 joined by graphitized graphite-forming precursor 304. The foam 300 includes a plurality of the fibers 302. The fibers 302 are joined and held together by the graphitized precursor 304 shown, for example, as "nodule-like" intersections of the fibers 302.

Although the invention has been shown and described with respect to certain embodiments, equivalent alterations and modifications will occur to others skilled in the art upon reading and understanding this specification and the annexed drawings. In particular regard to the various functions performed by the above described integers (components, assemblies, devices, compositions, steps, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as maybe desired and advantageous for any given or particular application. Therefore, it is to be understood that the invention disclosed herein is intended to cover such modifications as fall within the scope of the appended claims.

What is claimed is:

1. A microporous graphite foam, comprising a matrix of graphite fibers joined by a graphitized graphite-forming precursor, wherein the foam comprises an average pore size in the range from about 0.1 to about 10 microns and a void fraction in the range from about 80% to about 95%.

2. The foam of claim 1 wherein the graphite fibers have a diameter in the range from about 50 to about 250 nanometers.

3. The foam of claim 1 wherein the graphite fibers have a length in the range from about 25 microns to about 250 microns.

4. The foam of claim 1 wherein the graphite-forming precursor comprises one or more of a phenolic resin, a urethane resin, furfuryl alcohol and mesophase pitch.

5. The foam of claim 1 wherein the graphite-forming precursor is mesophase pitch.

6. The foam of claim 1 wherein the microporous graphitized foam has a void fraction in the range from about 85% to about 90%.

7. The foam of claim 1 wherein the microporous graphitized foam has an average pore size in the range from about 1 to about 5 microns.

8. A microporous graphite foam, comprising a matrix of graphite fibers joined by graphitized graphite-forming precursor made by a process comprising
   providing a plurality of graphite fibers;
   mixing the graphite fibers with a graphite-forming precursor;
   compressing the mixture;
   forming a precursor matrix comprising the graphite fiber and the graphite-forming precursor;
   first heating the matrix to a temperature at which the graphite-forming precursor is carbonized, forming a carbonized matrix; and
   second heating the carbonized matrix to a temperature at which the carbonized graphite-forming precursor is graphitized, forming the microporous graphite foam,
   wherein the foam comprises a void fraction in the range from about 80% to about 95%.

9. A cryogenic cooling system comprising
   an input for a cryogenic gas;
   a first cooling section into which the cryogenic gas passes from the input; and
   a second cooling section into which the cryogenic gas passes from the first cooling section;
   wherein the graphite foam of claim 1 is a component of the second cooling section.

10. The cryogenic cooling system of claim 9 wherein the graphite foam is a component of a cooling interface in the second cooling section of the cryogenic cooling system.

11. A cryogenic cooling system comprising an input for a cryogenic gas;
   a first cooling section into which the cryogenic gas passes from the input; and
   a second cooling section into which the cryogenic gas passes from the first cooling section;
   wherein the graphite foam of claim 8 is a component of the second cooling section.

12. The cryogenic cooling system of claim 11 wherein the graphite foam is a component of a cooling interface in the second cooling section of the cryogenic cooling system.

* * * * *